US008443073B2

(12) United States Patent
Theilmann

(10) Patent No.: US 8,443,073 B2
(45) Date of Patent: May 14, 2013

(54) AUTOMATED PERFORMANCE PREDICTION FOR SERVICE-ORIENTED ARCHITECTURES

(75) Inventor: Wolfgang Theilmann, Karlsruhe (DE)

(73) Assignee: SAP AG, Walldorf (DE)

( * ) Notice: Subject to any disclaimer, the term of this patent is extended or adjusted under 35 U.S.C. 154(b) by 1342 days.

(21) Appl. No.: 11/541,760

(22) Filed: Oct. 2, 2006

(65) Prior Publication Data
US 2008/0177887 A1 Jul. 24, 2008

(51) Int. Cl.
G06F 15/177 (2006.01)
(52) U.S. Cl.
USPC .......................................................... 709/224
(58) Field of Classification Search .......... 709/220–224, 709/227–229; 714/39, 47; 702/108, 123
See application file for complete search history.

(56) References Cited

U.S. PATENT DOCUMENTS

| 5,101,340 | A | * | 3/1992 | Nonaka et al. | 717/109 |
|---|---|---|---|---|---|
| 5,794,005 | A | * | 8/1998 | Steinman | 703/17 |
| 6,097,885 | A | * | 8/2000 | Rayner | 703/17 |
| 7,069,204 | B1 | * | 6/2006 | Solden et al. | 703/14 |
| 7,099,797 | B1 | * | 8/2006 | Richard | 702/182 |
| 7,167,821 | B2 | * | 1/2007 | Hardwick et al. | 703/22 |
| 7,222,255 | B1 | * | 5/2007 | Claessens et al. | 714/4 |
| 7,353,160 | B2 | * | 4/2008 | Voigt | 703/17 |
| 2001/0044844 | A1 | * | 11/2001 | Takei | 709/224 |
| 2004/0193696 | A1 | * | 9/2004 | Howard et al. | 709/217 |
| 2005/0256692 | A1 | | 11/2005 | Monin et al. | |
| 2007/0022327 | A1 | * | 1/2007 | Otsuka et al. | 714/47 |
| 2007/0121712 | A1 | * | 5/2007 | Okamoto | 375/222 |
| 2007/0168494 | A1 | * | 7/2007 | Liu et al. | 709/224 |
| 2007/0203740 | A1 | * | 8/2007 | Abu El Ata et al. | 705/1 |
| 2008/0059625 | A1 | * | 3/2008 | Barnett et al. | 709/223 |
| 2009/0031018 | A1 | * | 1/2009 | Conkright et al. | 709/224 |

FOREIGN PATENT DOCUMENTS
WO 2006081365 A2 8/2006

OTHER PUBLICATIONS

"Distributed Management Task Force (DMTF): Tutorial on Common Information Model (CIM)," http://www.wbemsolutions.com/tutorials/CIM/index.html (Jun. 13, 2003).
Balsamo, Simonetta, et al., "Software Performance: state of the art and perspectives", *Technical report of Universit'a dell'Aquila and Universit'a Ca' Foscari di Venezia* http://ns.di.univag.it/~adimarco/technicalreports/techReport-perf.pdf, (Jan. 8, 2003).
Kounev, Samuel, et al., "Performance Modeling of", *Proceedings of the 2003 IEEE International Symposium on Performance Analysis of Systems and Software (ISPASS-2003)*, Austin, Texas. http://www.cl.cam.ac.uk/~sk507/pub/03-ispass-QPNs.pdf, (Mar. 6-8, 2003).
Office Action for EP Application No. 07106812.6, mailed Jan. 19, 2010, 4 pages.
Response to Office Action for EP Application No. 07106812.6, dated Dec. 20, 2007, 21 pages.
Extended EP Search Report for EP Application No. 07106812.6, mailed Sep. 9, 2007, 7 pages.

* cited by examiner

*Primary Examiner* — Larry Donaghue
(74) *Attorney, Agent, or Firm* — Brake Hughes Bellermann LLP

(57) ABSTRACT

The description relates to the field of automatically predicting the performance characteristics of a service-oriented architecture (SOA). The prediction is made by setting up a model of the service-oriented architecture, generating a queue of services to be executed, simulating execution of the services by utilizing the model while processing the queue, and determining the performance characteristics from data obtained from the simulation.

30 Claims, 2 Drawing Sheets

AUTOMATED PERFORMANCE PREDICTION FOR SERVICE-ORIENTED ARCHITECTURES

TECHNICAL FIELD

This description relates generally to the field of automated performance prediction and more specifically to automatically predicting the performance characteristics of a service-oriented architecture (SOA).

BACKGROUND

Predicting the performance (i.e., time behavior and resource consumption) of traditional, monolithic software solutions is typically based on measurements of specific end-to-end scenarios, mainly executed by the software developers and sometimes refined by customers. This approach is no longer sufficient for service-oriented architectures.

Service-oriented architectures offer great flexibility to customers as they can easily modify or even compose software solutions based on numerous services. Consequently, developers of software services no longer know under which conditions and in which scenarios their services will be used. Thus, accurate prediction of performance can only be made once a customer has decided how to compose his or her system.

Current approaches for performance prediction fall into one of the following areas:

Infrastructure models: An entire system infrastructure is modelled from an operational perspective. This allows online access to performance measures of various resources. In such models the dynamic behavior of services is not modelled at all; thus no prediction of service/system behavior can be performed.

Analytical approaches: There are numerous means for analytical performance analysis based on queuing networks, Petri nets or similar formalisms. Most of them rely on special Markov chains. Though powerful in theory a common problem to all these approaches is the state space explosion problem. The state space explosion problem relates to the computing complexity exponentially growing with the number of modelling entities. Modelling the dynamic behavior of service-oriented architectures does not scale at all as each behavioral element (e.g., decision operation) would have to become one dedicated element of the analytical model. Even worse, specific data values (input, output or internal state) may have a significant impact on the behavior but cannot be captured at all.

Simulation models: Numerous special-purpose simulation models have been used for different software systems. However, they are typically specific for each application (i.e., knowledge about the application characteristics and process flows is manually coded into the model).

Manual assessment: For practical reasons, this assessment will always be restricted to the evaluation of a small subset of all the potential scenarios and will also require a physical installation of the system in question.

Accordingly, it would be desirable and highly advantageous to have a method, computer program product, and system for automatically predicting the performance characteristics of a service-oriented architecture, such method, computer program product and system overcoming the above mentioned limitations and deficiencies of the current approaches.

SUMMARY

Therefore, an aspect of the present invention is to provide a method, computer program product and system which allow customers to predict the performance of different set-ups of a service-oriented architecture (e.g., different service compositions, different hardware elements) without the need to actually implement any of these architectures.

According to one embodiment of the present invention, automatically predicting the performance characteristics of a service-oriented architecture comprises the actions of setting up a model of the service-oriented architecture, generating a queue of services to be executed, simulating execution of the services by utilizing the model while processing the queue, and determining the performance characteristics from data obtained from the simulation.

Performance characteristics of a service-oriented architecture might be, for example, the throughput (i.e., the number of services being processed per given time interval) and required resources such as CPU-time and storage space.

Setting up a model of the service-oriented architecture may comprise at least one of the actions of specifying model elements (i.e., functions describing aspects of the model, as is shown in the following text), composing the model by using pre-specified model elements, composing the model by using pre-specified sub-models of service-oriented architectures, and reusing a model of a service-oriented architecture.

The model of the service-oriented architecture may comprise a service layer modelling the services of the service-oriented architecture, a physical layer modelling the characteristics of nodes and channels of the service-oriented architecture, and a deployment layer mapping the services to the nodes on which the services are deployed.

A node can be an abstraction of a complex sub-system such as a cluster or even a complete GRID environment and may even include certain software layers that are abstracted from the outside. The nodes are connected to each other by channels. The channels are used for communication between the nodes.

Characteristics of the nodes might be, for example, CPU-speed, memory size, disk storage size and storage access speed while bandwidth and latency are examples for characteristics of the channels.

The model of the service-oriented architecture may comprise a service functional behavior function describing the services' functional behavior by mapping the input parameters of a service to the output parameters and stating the services that are invoked as part of the service's execution, and a service non-functional behavior function describing the services' non-functional behavior by assigning a non-functional characteristic's value to each combination of service, input parameters and characteristic type.

Non-functional characteristics are categorized as either resources, which are used in a competitive way such as CPU-time, memory, network bandwidth or locks, or quality characteristics, which are independent of any usage patterns such as latency, reliability or portability.

For describing the characteristics of the nodes, the model of the service-oriented architecture may comprise a node non-functional characteristic function assigning a characteristic's value to each combination of node of the service-oriented architecture and characteristic type.

In order to consider the allocation of the nodes, the model of the service-oriented architecture may comprise for each node of the service-oriented architecture a node allocation function stating for each resource of the node the amount up to which the resource is used.

For describing the characteristics of the channels, the model of the service-oriented architecture may comprise a channel non-functional characteristic function assigning a characteristic's value to each combination of channel of the service-oriented architecture and characteristic type.

In order to consider the allocation of the channels, the model of the service-oriented architecture may comprise for each channel of the service-oriented architecture a channel allocation function stating for each resource of the channel the amount up to which the resource is used.

For describing a deployed system landscape, the model of the service-oriented architecture may comprise a deployment function mapping the services of the service-oriented architecture to nodes of the service-oriented architecture on which the services are deployed.

In the simplest case, generating a queue of services to be executed may comprise the actions of creating at least one invocation event by specifying a service to be executed and the service's input parameters, and adding the at least one invocation event to the queue.

This approach is, for example, sufficient for simulating the execution of one service in order to obtain the resource demand of the service.

If multiple concurrent executions of services are to be simulated, generating a queue of services to be executed may comprise the actions of evaluating probabilistic distribution functions in order to determine the invocations to be made at the current timestamp, specifying for each invocation to be made at the current timestamp the service and the service's input parameters by using a behavior function, creating for each invocation to be made at the current timestamp an invocation event having the current timestamp, and adding the invocation events to the queue.

The modelling of the usage behavior of the service-oriented architecture covers, firstly, the kind of service invocations that are made by the users (i.e., the services and the services' input parameters), and secondly, the service invocations' distribution over time. The latter is done by evaluating probabilistic distribution functions while the specification of the services and the services' input parameters is determined by evaluating the behavior function.

A timestamp is a time mark indicating the time when the timestamp was created. The current timestamp is a timestamp indicating a time which coincides with the current time of a means of setting a time. Such a means of setting a time is hereinafter referred to as a virtual clock. The virtual clock is named virtual since the time scale of the virtual clock need not coincide with the time scale of a wall clock (i.e., real time). Therefore, the virtual clock may be implemented by a counter which is incremented when the virtual clock turns on.

Simulating execution of the services by utilizing the model while processing the queue may comprise the actions of: checking the queue for events which are to be processed (e.g., events having the current timestamp); if the queue comprises an event which is to be processed, taking the event from the queue; computing the event's resource demand; allocating the resource demand; and computing the event's response time.

Computing the event's resource demand may comprise computing the event's resource demand related to communication activities (e.g., capacity for transmitting data between nodes) and computing the event's resource demand related to computation activities (e.g., CPU cycles, memory space).

A resource demand related to communication activities is expressed in the number of communication requests and the amount of transmitted data. For any communication activity the involved services are known from the specification of the invocation. The nodes related to the communication are derived by using the deployment function. If both services are deployed on the same physical node, the associated communication time is neglected. Otherwise, the channel or the set of channels that actually connect the two nodes is determined.

A resource demand related to computation activities may be expressed in a variety of measures such as CPU-demand, storage demand or locks on exclusive sections. It can be computed by making use of the service non-functional behavior function.

Allocating the resource demand may comprise checking whether resources are available and allocating the resource demand as soon as the resources are available (e.g., if 3 CPU cycles are needed but the next 5 slots are already allocated, then the cycles 6 to 8 are allocated).

The allocation of resources of channels is done by using the channel allocation function whereas the nodes allocation function is used for allocating resources of nodes.

By modelling the usage behavior, computing the services' resource demands, and allocating the resource demands the method, computer program product and system take into account the dynamic behavior of the service-oriented architecture.

For simulating execution of services for a period of time, a virtual clock may be used. When the virtual clock turns on, the current timestamp is increased. New invocation events are then created, as described above, for the new current timestamp.

Thus, simulating execution of the services by utilizing the model while processing the queue may further comprise checking whether the queue is empty and increasing the virtual clock if the queue is empty.

As already mentioned, the service functional behavior function might state services that are invoked as part of a service's execution. For completing the service's execution, these sub-sequent services have to be executed.

Therefore, simulating execution of the services by utilizing the model while processing the queue may further comprise the actions of: checking whether sub-sequent service invocations are to be made; creating for each sub-sequent service invocation to be made an invocation event; and adding the invocation events of the sub-sequent service invocations to the queue.

Finally, the performance characteristics are determined from data (e.g., resource demands, execution times) obtained from the simulation. Therefore, for any communication activity, the communication time is derived by making use of the channel non-functional characteristic function. For any service execution, the associated node is determined by using the deployment function, and the execution time is computed by making use of the node non-functional characteristic function.

BRIEF DESCRIPTION OF THE DRAWINGS

For a more complete understanding of the present invention and its features and advantages, reference is made to the following description, taken in conjunction with the accompanying drawings, in which.

DETAILED DESCRIPTION

According to an embodiment of the present invention, a method is provided for automatically predicting the performance characteristics of a service-oriented architecture. The method utilizes a usage behavior and a model of the service-oriented architecture. The model of the service-oriented architecture may comprise a service layer, a physical layer and a deployment layer.

Figure 1:
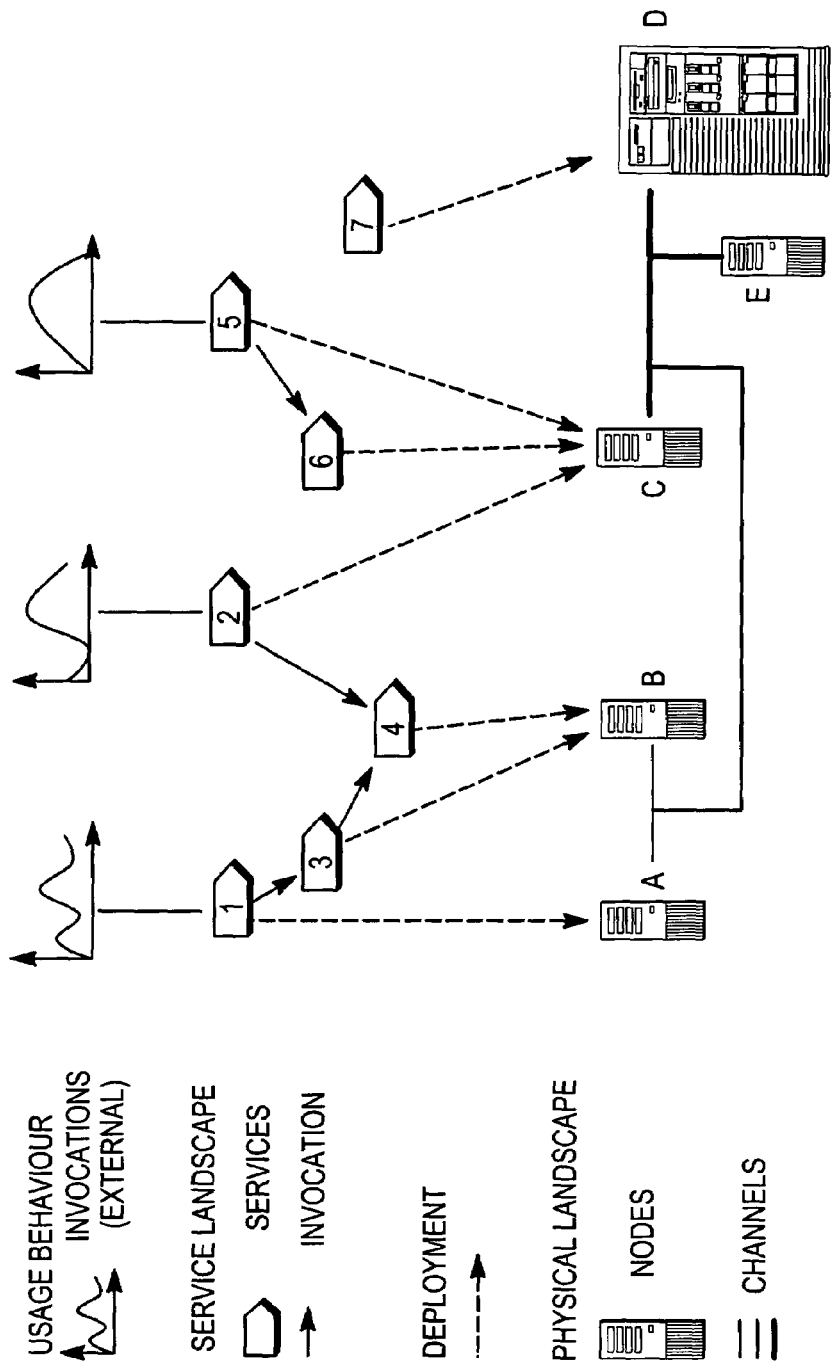
FIG. 1 illustrates schematically the interaction of the different model layers.

FIG. 1 illustrates schematically the interaction of the different model layers and the usage behavior. At the top of FIG. 1, the usage behavior is depicted by showing distribution functions of invocations. The service layer is shown below the usage behavior. Invocations of the usage behavior result in services which are to be executed. The services are sketched by numbered polygons 1, 2, 3, 4, 5, 6, and 7. The execution of services might generate the invocation of subsequent service invocations, as shown for the services 1, 2, 3, and 5. At the bottom of FIG. 1, the physical layer is depicted by showing the nodes A, B, C, D, and E and the channels connecting the nodes. Between the service layer and the physical layer, the deployment layer is sketched by dashed arrows. The arrows symbolize the deployment of the services on the nodes.

For a general description of the functions specifying the model layers and the usage behavior the following definitions are introduced.

S denotes a set of services, N a set of nodes, C a set of channels, U a set of users, R a set of resources, and T a set of non-functional characteristic types. Additionally, for expressing input, output and non-functional characteristic values in a general way, the following variables are introduced. An arbitrary input value of a service is denoted as in and out denotes an arbitrary output value of a service. Furthermore, an arbitrary value of a non-functional characteristic is denoted as char.

For modelling the service layer, the functional behavior of services can be described by a service functional behavior function that maps the input parameters of a service to the output parameters and also states those other services that are invoked as part of the service computation:

$$f_S(s, in) = (out, s_1, \ldots, s_n, in_1, \ldots, in_n)$$

where $s, s_i \in S$ and $n := s(n) :=$ number of invoked sub-services.

The non-functional behavior of services can be described by a service non-functional behavior function that assigns a non-functional characteristic's value to each combination of service, input parameters and characteristic type.

$$h_S(s, in, t) = (char)$$

where $s \in S$ and $t \in T$.

Often, it is not necessary to model all the actual input and output parameters of a service. Instead, the model most often can be created on a higher abstraction level that reflects only those parameters that have an impact on the service functional/non-functional behavior. For example, the performance of a service executing a sorting on a given input set typically just depends on the size of the set. So instead of modelling the complete set as input parameter, it is sufficient to just have one numerical input parameter that describes the size of the set.

For modelling the physical layer, the characteristics of nodes are described by a node non-functional characteristic function that assigns a value to each node and characteristic type.

$$h_N(n, t) = (char)$$

where $n \in N$ and $t \in T$.

A typical node specification might consist of specification of CPU-speed, storage size (at cache-levels, physical/virtual memory, disk storage) and storage access speed.

The characteristics of channels are described by a channel non-functional characteristic function that assigns a value to each channel and characteristic type.

$$h_C(c, t) = (char)$$

where $c \in C$ and $t \in T$.

A typical channel specification might consist of bandwidth and latency.

The deployment layer is modelled by a deployment function that maps the services to those nodes on which the services are deployed.

$$d: S \rightarrow N$$

For modelling the usage behavior, the behavior of a single user with respect to a single service is described as tuple containing the abstract invocation parameters as well as a distribution function that describes the actual distribution of invocations over time.

$$b(u, s) = (in, i_{u,s})$$

where $u \in U$ and $s \in S$ and where in is the invocation parameter to service s and $i_{u,s}$ the invocation distribution:

$$i_{u,s}: [\text{time period}] \rightarrow [0, 1].$$

The distribution function produces a probabilistic value for each time interval that expresses the likelihood for an invocation to be actually made.

The following simple example illustrates the above defined functions.

In the example a system consisting of two services $S = \{s_O, s_W\}$ is assumed. The first service $s_O$ being an order service taking customer orders for delivering certain goods and the second service $s_W$ being a warehouse service managing the goods within a warehouse. Furthermore, the system is assumed to be able to deliver two kinds of goods, namely physical goods which must be delivered from the warehouse and virtual goods that can be delivered at infinite capacity. The warehouse service $s_W$ is used by the order service so to check for the availability of physical goods.

The functional behavior model of the order service takes as input parameters the number of physical and virtual goods ordered. The result of the order service's functional behavior model is the number of physical and virtual goods that have successfully been ordered. If any physical goods have been ordered, the model also specifies a sub-sequent call to the warehouse service indicating the number of physical goods ordered.

The functional behavior model of the warehouse service simply takes the number of ordered physical goods as input parameter and outputs the number of delivered physical goods. No sub-sequent service calls are generated.

A slightly simplified formal notation of the service functional behavior function can be described as follows.

$$f_S(s_O, \#physicalGoods, \#virtualGoods) = (\#physicalGoodsDelivered, \#virtualGoodsDelivered, s_W, \#physicalGoods)$$

$$f_S(s_W, \#physicalGoods) = \#physicalGoodsDelivered)$$

It is further assumed that the only non-functional characteristic being considered is the CPU usage measured in some abstract CPU cycles. Then, the non-functional model of both services might be described as follows.

$$h_S(s_O, \#physicalGoods, \#virtualGoods, CPU\_cycles) = a * \#physicalGoods + b * \#virtualGoods$$

$$h_S(s_W, \#physicalGoods, CPU\_cycles) = c * physicalGoods \text{ with some constant parameters } a, b \text{ and } c.$$

The physical layer might consist of two nodes $N=\{n_1, n_2\}$, connected via one channel $C=\{c\}$. Both nodes have a CPU speed of 10 cycles per second.

$$h_N(n_1, \text{CPU\_cycles}) = h_N(n_2, \text{CPU\_cycles}) = 10 (\text{per second})$$

As only CPU usage is considered, the channel information is not relevant for this example.

The deployment layer assigns each service to a dedicated node, for example $$d := \{(s_O, n_1), (s_W, n_2)\}$$

Finally, the usage behavior specifies two users $U=\{u_1, u_2\}$. The first user requests 10 physical goods per second and the second user requests 5 virtual and 5 physical goods every 2 seconds. Both rates are average numbers of a probabilistic function.

$$b(u_1, s_O) = (10, 0, 1 \text{ call per second})$$

$$b(u_2, s_O) = (5, 5, 0.5 \text{ calls per second})$$

Setting up the usage behavior and the model of the service-oriented architecture, as described above, is the first action of the method. In the following description the remaining actions of the method are illustrated.

Figure 2:
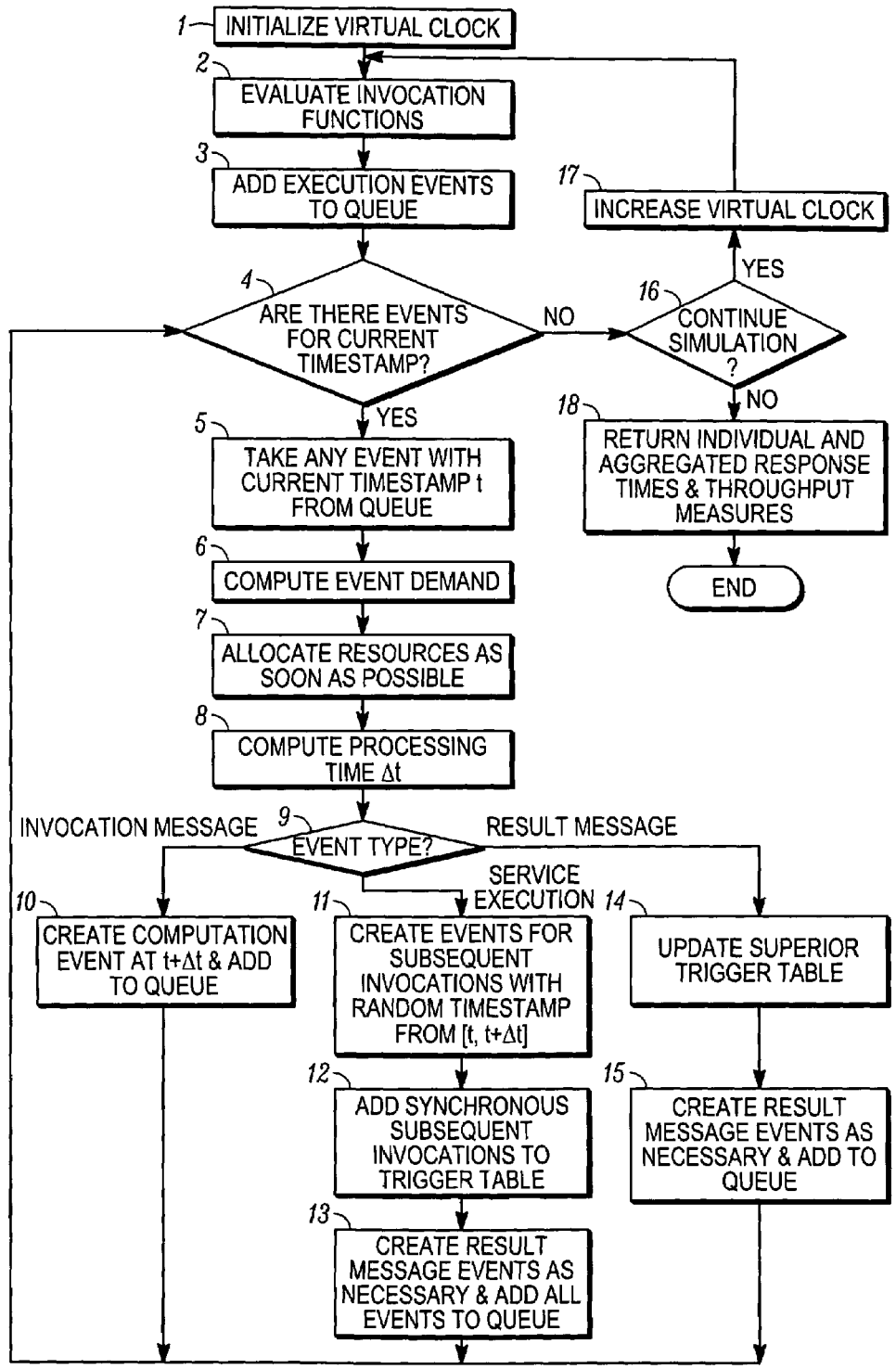
FIG. 2 is a flowchart illustrating a method for automatically predicting the performance characteristics of a service-oriented architecture.

FIG. 2 is a flowchart illustrating a method for automatically predicting the performance characteristics of a service-oriented architecture.

When the method predicts the time behavior (i.e., response time and throughput) of multiple concurrent service flows, it makes full usage of all model layers and the usage behavior. However, the utilization of all model layers and the usage behavior is not required for all prediction scenarios. For example, the prediction of one service's resource demand requires only the modelling of the service layer.

The method is realized as an event-based simulation that is tailored to the situation of a service-oriented architecture. A discrete linear time-scale TS is assumed such that each point in time represents the time interval between this point in time and the next one.

An event is defined as either a communication event (i.e., an invocation message or a result message) or a computation event (i.e., the execution of a service). Each communication event is assigned to a channel or a sequence of channels. Furthermore, each computation event is assigned to a node. Finally, each event is marked with a timestamp showing when the event has been created.

In addition, the method maintains a node allocation function $$\text{alloc}_N(n, r, p) = (\text{percentage}) \text{ where } n \in N, r \in R, p \in TS$$

and a channel allocation function $$\text{alloc}_C(c, r, p) = (\text{percentage}) \text{ where } c \in C, r \in R, p \in TS.$$

The allocation is expressed as a percentage value up to which the respective resource r is used.

Finally, the method maintains a trigger table that captures for each service execution the specific synchronous sub-service invocations the current service execution has to wait for until it can return its final result.

In actions (2) and (3) of the method the queue of services to be executed is generated. Therefore, probabilistic distribution functions of the usage behavior descriptions are evaluated. Whenever the evaluation results in an invocation to be triggered, an event is put into a queue. The event specifies the invocation together with the current timestamp.

For simulating execution of services; for a period of time, the method uses a virtual clock which is initialized in action (1). The time of the virtual clock is increased in action (17).

In actions (4) to (16) the execution of the services is simulated by utilizing the model while processing the queue.

In action (18) the performance characteristics are determined from data obtained in actions (6) and (8) and, finally, output.

In the following, the different actions of the method are described in detail.

In action (1) the virtual clock is initialized to the initial timestamp of the overall simulation.

The probabilistic functions describing the external service invocations $i_{u,s}$ are evaluated in action (2) in order to determine which invocations are to be made at the current timestamp. The behavior function b (u, s) is then used to specify the actual invocation characteristics, (i.e., the target service and the invocation parameters).

In action (3) events for the relevant invocations are created and put into the event queue. The simplified approach presented here, ignores communication between end-users and the service oriented architecture. Thus, rather than creating invocation events the respective execution events are created.

Action (4) consists of checking the event queue if there are any events that have the current timestamp according to the virtual clock.

If there are events having the current timestamp according to the virtual clock, in action (5) an arbitrary event with the current timestamp is chosen from the event queue.

In action (6) the resource demand related to the chosen event is computed.

A resource demand related to communication activities is expressed in the number of communication requests and the amount of transmitted data. For any communication activity the involved services are known from the specification of the invocation. The nodes related to the communication are derived by using the deployment function d. If both services are deployed on the same physical node, the associated communication time is neglected. Otherwise, the channel or the set of channels that actually connect the two nodes is determined.

A resource demand related to computation activities may be expressed in a variety of measures such as CPU-demand, storage demand or locks on exclusive sections. It can be computed based on the service non-functional behavior function $h_S$ (s, in, t) specified in the service layer.

In action (7) the required resources are allocated via the node allocation function and the channel allocation function as soon as the resources become available.

In action (8) the processing time $\Delta t$ of the event is computed.

For any communication activity, the overall communication time is derived by making use of the channel non-functional characteristic function $h_C$ (c, t).

For any service execution, the associated node is determined by using the deployment function d and the execution time is computed by making use of the node non-functional characteristic function $h_N$ (n, t).

The actions (10)-(15) depend on the actual event type. Thus, in action (9) is checked whether the event is a communication event or a computation event. The communication events are further subdivided into invocation message events and result message events.

For any invocation event, a computation event related to the service that has actually been invoked is directly created in action (10). The timestamp is simply the time when the invocation event has completely finished (i.e., $t+\Delta t$).

For any computation event, events for all the sub-sequent service invocations, as specified by the service functional behavior function $f_S(s, in)=(out, s_1, \ldots, s_n, in_1, \ldots, in_n)$, are created in action (11). The sub-sequent service invocations get a random timestamp from the interval $[t, t+\Delta t]$.

Synchronous invocations of sub-sequent services imply that the invoking service has to wait for the result of the sub-sequent service until it can deliver its overall result. In order to keep track of such relationships in action (12) an entry is put into a dedicated trigger table which specifies the actual instance of the invoking service and the sub-sequent service.

In case there is no sub-sequent invocation the current service has to wait for, in action (13) an event for the result message can immediately be created with the timestamp $t+\Delta t$. Finally, all events (sub-sequent invocations and result message) created throughout the service computation are added to the event queue.

For any result message event, in action (14) first the internal trigger table is updated in order to signal for potentially waiting superior services that the subordinate service invocation has been completely finished.

In case any superior service was simply waiting for the result message processed in action (14), the trigger table now indicates that the subordinate service is fully processed and thus an event for the result message of the superior service can be created in action (15). The event receives the timestamp of the finished result message of the subordinate service (i.e., $t+\Delta t$). Finally, the event is added to the event queue.

In case there are no further events for the current timestamp (i.e., action (4)), it is checked in action (16) whether the whole simulation needs to be continued.

If the simulation is to be continued, the timestamp counter of the virtual clock is incremented in action (17) and it is continued with the evaluation of the invocation functions (i.e., action (2)).

If the simulation is not to be continued, in action (18) the time behavior results are returned both on overall basis and on individual basis (e.g., per service, per node, per service flow, etc.). Throughput measures are directly derived from response time and event timestamps.

The presented method contains some probabilistic elements, namely in the evaluation of the invocation functions and the selection of events from the event queue. In order to get even more representative predictions, one could also repeat the overall simulation process several times and then report both average values and extreme values of the performance characteristics.

For predicting the performance characteristics of a service-oriented architecture, it is essential to take into account the dynamic behavior of the service-oriented architecture as accurate as possible. The behavior and thus the performance of real services depend on input and internal state. Even when a service is executed in the same service-oriented architecture, each invocation of the service can have a completely different behavior if the internal state of the service-oriented architecture varies for the invocations.

By evaluating probabilistic distribution functions of the usage behavior descriptions (i.e., actions (2) and (3)), computing the services' resource demands (i.e., action (6)), and allocating the resource demands (i.e., action (7)) the method takes into account the dynamic behavior of the service-oriented architecture.

Since the resource demands of the services are computed in action (6) of the presented method, a person skilled in the art may appreciate that the method can be easily adapted to return the services' resource demands. Furthermore, the sequence of actions may be altered where appropriate.

Following, based on the example introduced above, the processing of the algorithm is illustrated. Again, for the sake of simplicity, any demand and resource computation related to channels and communication activities are omitted.

First, in action (1), the virtual clock is initialized with timestamp 0. It is assumed that the probabilistic evaluation of both invocation functions (action (2)) results in the creation of an event. Thus, two events are obtained (within the simplified model, invocation events are directly translated to execution events)

$E1:=(\text{execute}=s_O, \text{input parameters}=(10, 0), \text{timestamp}=0))$ $E2:=(\text{execute}=s_O, \text{input parameters}=(5, 5), \text{timestamp}=0))$ which are added to the previously empty event queue (action (3)). The check in action (4) detects an event for the current timestamp 0 and in action (5) one of the available events is randomly taken from the queue, for example, event E2.

Action (6) computes the demand related to this event by using function $h_S$ with the parameters taken from event E2, i.e., $(s_O, 5, 5, \text{CPU\_cycles})$. If $a=b=c=10$ is assumed, this results to 100 (CPU cycles).

Knowing from the deployment function d that service $s_O$ is deployed on node $n_1$, action (7) allocates the resources (i.e., 100 CPU cycles) of node $n_1$. Starting from the next available slot (i.e., timestamp 0), the time interval $[0, 10]$ is allocated.

By using function $h_N$, action (8) computes the processing time to be $\Delta t=10$ seconds.

As the current event is a service execution, action (9) branches to action (11).

Action (11) creates invocation events for sub-sequent service invocations by evaluating function $f_S$ and taking a random timestamp out of $[t,t+\Delta t]$, i.e., $[0,10]$, for example 7. Thus, the following event E3 is created.

$E3:=(\text{invoke}=s_W, \text{input parameters}=(5), \text{timestamp}=7))$

Action (12) registers in the trigger table that the current service execution has to wait for the completion of the sub-service call specified by event E3.

No result messages are created in action (13) because the service has to wait for the completion of the E3 sub-service call. However, event E3 is added to the event queue.

The overall algorithm continues with action (4) selecting event E2 as the next event to be processed. The processing results in a demand of 100 (CPU cycles), but the resources of node $n_1$ can only be allocated for the time interval $[10, 20]$.

As the service execution does not require any sub-sequent invocations, the result message event can directly be created.

$E4:=(\text{result}=s_O, \text{output parameters}=(10,0), \text{timestamp}=20))$ Next, the algorithm continues with action (4). As there are no events for the current timestamp (which is still 0), the simulation is continued by stepwise increasing the virtual clock. Assuming that no further invocations are triggered, the current timestamp is increased to the value of 7 for which the next event (i.e., event E3) is contained in the queue.

This event is processed by actions (5)-(9) (not creating any demand as communication demand is ignored).

Action (10) creates the computation event $E5:=(\text{execute}=s_W, \text{input parameters}=(5) \text{ timestamp}=7))$ which is directly added to the event queue.

Next, event E5 is processed by actions (5)-(9) (with demand of 50 CPU cycles thus requiring 5 seconds) and (11)-(13). Subsequently, a result message event is created.

$E6:=(result=s_W, output parameters=(5), timestamp=12))$

Then, event E6 is processed by actions (5)-(9) (not creating any demand as communication demand is ignored).

By using the trigger table, action (14) reveals that event E6 contributes to the completion of event E1. Consequently, it creates event $E7:=(result=s_O, output parameters=(5,5), timestamp=12))$.

Eventually, both events E4 and E7 are completed (being result communication events they do not create any demand) and the overall algorithm terminates assuming that no further invocations are triggered.

The presented method, computer program product and system may be extended and adapted in various ways.

For example, the modelling of the service layer may be enhanced by means to describe internal service state as well as different service configuration parameters. For example, the modelling of a service layer including internal state may be described as follows:

$f_S(s, in, state_s) = (out, s_1, \ldots, s_n, in_1, \ldots, in_n, state_s')$ $h_S(s, in, state_s, t) = (char, state_s')$ where $state_s$ is the state of service s at invocation time and where $state_s'$ is the state after the service execution.

Furthermore, models of services may be modelled with open parameters which are to be specified by a customer (e.g., probability for branching conditions).

In addition, the method, computer program product and system may be extended by introducing probability distributions or values in numerous actions of the method (e.g., action of invocation of sub-sequent services, action of computing the resource demand).

Also, the modelling of non-functional properties could be extended beyond the area of performance to areas like reliability, usability, maintainability and portability. To make full use of this, means to aggregate those properties in the respective prediction algorithms are also needed.

The modelling of service invocations may be extended by asynchronous communication patterns which basically affect the need of the trigger table as service executions do not need to wait for the completion of sub-sequent services.

Furthermore, the modelling of service invocations may be extended by an indirection layer in a way that a superior service simply specifies sub-sequent services in an abstract way and a service broker/discovery mechanism is in actual charge of mapping this invocation to a concrete service. Such mapping information may be modelled by a mapping table.

The modelling of the usage behavior may be extended by also considering the communication between end-user machines and the network (i.e., channels) within the service-oriented architecture. This could be done by associating each service invocation with a channel.

The actual model of a service-oriented architecture and the usage behavior may be formalized by different formalisms, e.g., specific UML profiles.

Finally, the computation of the timestamp for the synchronous invocation of sub-sequent services may be adapted such that only one synchronous invocation is processed per point in time and that the next synchronous invocation can only be processed after the present synchronous invocation has finished and has returned its results.

The present invention provides a method, computer program product and system which allow customers to predict the performance of different set-ups of a service-oriented architecture (e.g., different service compositions, different hardware elements) without the need to actually implement any of these architectures. Thus, the present invention supports customers in the processes of planning and optimizing a service-oriented architecture. Determining the appropriate size of a service-oriented architecture's hardware landscape and finding out the optimal set-up of a service-oriented architecture's service landscape are only two of a plurality of examples for the application of the present invention.

Although an embodiment of the present invention and its advantages are described in detail, a person skilled in the art could make various alterations, additions, and omissions without departing from the spirit and scope of the present invention as defined by the appended claims.

What is claimed is:

1. A method for automatically predicting performance characteristics of a service-oriented architecture, comprising:
    setting up a model of the service-oriented architecture;
    generating a queue of services to be executed, the queue including events associated with execution of the services and queued on a timeline using corresponding timestamps;
    simulating execution of the services by utilizing the model while processing the queue, including
        selecting at least one event at a first timestamp on the timeline;
        determining a processing time associated with the at least one event;
        determining a type of the at least one event among a plurality of types including an invocation event, an execution event, and a result event;
        generating at least one new event for the at least one event for addition to the queue, based on the determined type;
        inserting the at least one new event into the queue at a timestamp subsequent to the first timestamp;
        updating the first timestamp to a second timestamp that is subsequent to the first timestamp within the queue;
        continuing the processing of the queue including selecting at least one second event at the second timestamp; and
    determining the performance characteristics from data obtained from the simulation, the data including the processing time of each of the at least one event, the at least one new event, and the at least one second event.

2. The method of claim 1, wherein setting up a model of the service-oriented architecture comprises at least one of the actions of:
    specifying model elements;
    composing the model by using pre-specified model elements;
    composing the model by using pre-specified sub-models of service-oriented architectures; and
    reusing a model of a service-oriented architecture.

3. The method of claim 1, wherein the model of the service-oriented architecture comprises:
    a service layer modelling the services of the service-oriented architecture;
    a physical layer modelling the characteristics of nodes and channels of the service-oriented architecture; and
    a deployment layer mapping the services to the nodes on which the services are deployed.

4. The method of claim 1, wherein the model of the service-oriented architecture comprises:
    a service functional behavior function describing the services' functional behavior by mapping input parameters of a service to output parameters and stating the services that are invoked as part of the service's execution; and
    a service non-functional behavior function describing the services' non-functional behavior by assigning a non-functional characteristic's value to each combination of service, input parameters and characteristic type.

5. The method of claim 1, wherein the model of the service-oriented architecture comprises:
    a node non-functional characteristic function assigning a characteristic's value to each combination of nodes of the service-oriented architecture and characteristic type;
    for each node of the service-oriented architecture a node allocation function stating for each resource of the node and for each point in time the amount up to which the resource is used;
    a channel non-functional characteristic function assigning a characteristic's value to each combination of channels of the service-oriented architecture and characteristic type; and
    for each channel of the service-oriented architecture a channel allocation function stating for each resource of the channel and for each point in time the amount up to which the resource is used.

6. The method of claim 1, wherein the model of the service-oriented architecture comprises a deployment function mapping the services of the service-oriented architecture to nodes of the service-oriented architecture on which the services are deployed.

7. The method of claim 1, wherein generating a queue of services to be executed comprises:
    creating at least one invocation event by specifying a service to be executed and the service's input parameters; and
    adding the at least one invocation event to the queue.

8. The method of claim 1, wherein generating a queue of services to be executed comprises:
    evaluating probabilistic distribution functions in order to determine invocations to be made at associated timestamps;
    specifying for each invocation to be made at each associated timestamp the service and the service's input parameters by using a behavior function;
    creating for each invocation to be made at each associated timestamp an invocation event having the associated timestamp; and
    adding each invocation event to the queue at its associated timestamp.

9. The method of claim 1, wherein determining a processing time associated with the at least one event comprises:
    computing a resource demand of the at least one event;
    allocating the resource demand; and
    computing the at least one event's processing time.

10. The method of claim 9, wherein simulating execution of the services by utilizing the model while processing the queue further comprises:
    checking whether sub-sequent service invocations are to be made;
    creating for each sub-sequent service invocation to be made an invocation event; and
    adding the invocation events of the sub-sequent service invocations to the queue.

11. A system for automatically predicting the performance characteristics of a service-oriented architecture, comprising:
    a database operable to store at least one of
        a plurality of model elements for modelling a service-oriented architecture,
        a plurality of models of services,
        a plurality of models of service-oriented architectures, and
        any combination of the preceding; and
    a computer system coupled to the database and operable to:
        set up a model of the service-oriented architecture;
        generate a queue of services to be executed, the queue including events associated with execution of the services and queued on a timeline using corresponding timestamps;
        simulate execution of the services by utilizing the model while processing the queue, including
            selecting at least one event at a first timestamp on the timeline;
            determining a processing time associated with the at least one event;
            determining a type of the at least one event among a plurality of types including an invocation event, an execution event, and a result event;
            generating at least one new event for the at least one event for addition to the queue, based on the determined type;
            inserting the at least one new event into the queue at a timestamp subsequent to the first timestamp;
            updating the first timestamp to a second timestamp that is subsequent to the first timestamp within the queue;
            continuing the processing of the queue including selecting at least one second event at the second timestamp; and
        determining the performance characteristics from data obtained from the simulation, the data including the processing time of each of the at least one event, the at least one new event, and the at least one second event.

12. The system of claim 11, wherein the computer system is operable to set up a model of the service-oriented architecture by processing at least one of the actions of:
    specifying model elements;
    composing the model by using pre-specified model elements;
    composing the model by using pre-specified sub-models of service-oriented architectures; and
    reusing a model of a service-oriented architecture.

13. The system of claim 11, wherein the model of the service-oriented architecture comprises:
    a service layer modelling the services of the service-oriented architecture;
    a physical layer modelling the characteristics of nodes and channels of the service-oriented architecture; and
    a deployment layer mapping the services to the nodes on which the services are deployed.

14. The system of claim 11, wherein the model of the service-oriented architecture comprises:
    a service functional behavior function describing the services' functional behavior by mapping input parameters of a service to output parameters and stating the services that are invoked as part of the service's execution; and
    a service non-functional behavior function describing the services' non-functional behavior by assigning a non-functional characteristic's value to each combination of service, input parameters and characteristic type.

15. The system of claim 11, wherein the model of the service-oriented architecture comprises:
- a node non-functional characteristic function assigning a characteristic's value to each combination of nodes of the service-oriented architecture and characteristic type;
- for each node of the service-oriented architecture a node allocation function stating for each resource of the node the amount up to which the resource is used;
- a channel non-functional characteristic function assigning a characteristic's value to each combination of channels of the service-oriented architecture and characteristic type; and
- for each channel of the service-oriented architecture a channel allocation function stating for each resource of the channel the amount up to which the resource is used.

16. The system of claim 11, wherein the model of the service-oriented architecture comprises a deployment function mapping the services of the service-oriented architecture to nodes of the service-oriented architecture on which the services are deployed.

17. The system of claim 11, wherein the computer system is operable to generate a queue of services to be executed by:
- creating at least one invocation event by specifying a service to be executed and the service's input parameters; and
- adding the at least one invocation event to the queue.

18. The system of claim 11, wherein the computer system is operable to generate a queue of services to be executed by:
- evaluating probabilistic distribution functions in order to determine invocations to be made at associated timestamps;
- specifying for each invocation to be made at each associated timestamp the service and the service's input parameters by using a behavior function;
- creating for each invocation to be made at each associated timestamp an invocation event having the associated timestamp; and
- adding each invocation event to the queue at its associated timestamp.

19. The system of claim 11, wherein the computer system is operable to determine a processing time associated with the at least one event comprises:
- computing a resource demand of the at least one event;
- allocating the resource demand; and
- computing the at least one event's processing time.

20. The system of claim 19, wherein the computer system is operable to simulate execution of the services by utilizing the model while processing the queue by further:
- checking whether sub-sequent service invocations are to be made;
- creating for each sub-sequent service invocation to be made an invocation event; and
- adding the invocation events of the sub-sequent service invocations to the queue.

21. Computer program product for automatically predicting the performance characteristics of a service-oriented architecture, the computer program product embodied in a non-transitory computer-readable storage medium and when executed by a computer operable to:
- set up a model of the service-oriented architecture;
- generate a queue of services to be executed, the queue including events associated with execution of the services and queued on a timeline using corresponding timestamps;
- simulate execution of the services by utilizing the model while processing the queue, including
  - selecting at least one event at a first timestamp on the timeline;
  - determining a processing time associated with the at least one event;
  - determining a type of the at least one event among a plurality of types including an invocation event, an execution event, and a result event;
  - generating at least one new event for the at least one event for addition to the queue, based on the determined type;
  - inserting the at least one new event into the queue at a timestamp subsequent to the first timestamp;
  - updating the first timestamp to a second timestamp that is subsequent to the first timestamp within the queue;
  - continuing the processing of the queue including selecting at least one second event at the second timestamp; and
- determining the performance characteristics from data obtained from the simulation, the data including the processing time of each of the at least one event, the at least one new event, and the at least one second event.

22. The computer program product of claim 21, operable to set up a model of the service-oriented architecture by processing at least one of the actions of:
- specifying model elements;
- composing the model by using pre-specified model elements;
- composing the model by using pre-specified sub-models of service-oriented architectures; and
- reusing a model of a service-oriented architecture.

23. The computer program product of claim 21, wherein the model of the service-oriented architecture comprises:
- a service layer modelling the services of the service-oriented architecture;
- a physical layer modelling the characteristics of nodes and channels of the service-oriented architecture; and
- a deployment layer mapping the services to the nodes on which the services are deployed.

24. The computer program product of claim 21, wherein the model of the service-oriented architecture comprises:
- a service functional behavior function describing the services' functional behavior by mapping input parameters of a service to output parameters and stating the services that are invoked as part of the service's execution; and
- a service non-functional behavior function describing the services' non-functional behavior by assigning a non-functional characteristic's value to each combination of service, input parameters and characteristic type.

25. The computer program product of claim 21, wherein the model of the service-oriented architecture comprises:
- a node non-functional characteristic function assigning a characteristic's value to each combination of nodes of the service-oriented architecture and characteristic type;
- for each node of the service-oriented architecture a node allocation function stating for each resource of the node the amount up to which the resource is used;
- a channel non-functional characteristic function assigning a characteristic's value to each combination of channels of the service-oriented architecture and characteristic type;
- for each channel of the service-oriented architecture a channel allocation function stating for each resource of the channel the amount up to which the resource is used.

26. The computer program product of claim 21, wherein the model of the service-oriented architecture comprises a deployment function mapping the services of the service-oriented architecture to nodes of the service-oriented architecture on which the services are deployed.

27. The computer program product of claim 21, operable to generate a queue of services to be executed by:
   creating at least one invocation event by specifying a service to be executed and the service's input parameters; and
   adding the at least one invocation event to the queue.

28. The computer program product of claim 21, operable to generate a queue of services to be executed by:
   evaluating probabilistic distribution functions in order to determine invocations to be made at associated timestamps;
   specifying for each invocation to be made at each associated timestamp the service and the service's input parameters by using a behavior function;
   creating for each invocation to be made at each associated timestamp an invocation event having the associated timestamp; and
   adding each invocation event to the queue at its associated timestamp.

29. The computer program product of claim 21, operable to determine a processing time associated with the at least one event comprises:
   computing a resource demand of the at least one event;
   allocating the resource demand; and
   computing the at least one event's processing time.

30. The computer program product of claim 29, operable to simulate execution of the services by utilizing the model while processing the queue by further:
   checking whether sub-sequent service invocations are to be made;
   creating for each sub-sequent service invocation to be made an invocation event; and
   adding the invocation events of the sub-sequent service invocations to the queue.

* * * * *